US012759923B2

(12) United States Patent
Lee

(10) Patent No.: US 12,759,923 B2
(45) Date of Patent: Oct. 13, 2026

(54) METHOD FOR MANUFACTURING GLASS BEADS USING WASTE GLASS AND GLASS BEADS

(71) Applicant: Yong Su Lee, Goyang-si (KR)

(72) Inventor: Yong Su Lee, Goyang-si (KR)

( * ) Notice: Subject to any disclaimer, the term of this patent is extended or adjusted under 35 U.S.C. 154(b) by 131 days.

(21) Appl. No.: 18/886,930

(22) Filed: Sep. 16, 2024

(65) Prior Publication Data

US 2026/0078043 A1 Mar. 19, 2026

(51) Int. Cl.

*C03B 19/10* (2006.01)
*C03B 5/00* (2006.01)
*C03B 33/02* (2006.01)

(52) U.S. Cl.

CPC .......... *C03B 19/1005* (2013.01); *C03B 5/005* (2013.01); *C03B 33/02* (2013.01)

(58) Field of Classification Search

None
See application file for complete search history.

(56) References Cited

U.S. PATENT DOCUMENTS 842,450 A * 1/1907 Ennis ...................... F16B 39/10 411/948
3,630,261 A * 12/1971 Gley ..................... F16B 5/0208 411/315
2015/0330431 A1* 11/2015 McKenna ............... F16B 13/08 411/82
2018/0135679 A1* 5/2018 Dichiara, Jr. ....... F16B 13/0808
2023/0375032 A1* 11/2023 Wu ....................... F16B 41/002

FOREIGN PATENT DOCUMENTS

KR 10-2022-0048142 A 4/2022
KR 10-2022-0124341 A 9/2022

OTHER PUBLICATIONS

KR20020124341 machine translation, Jung Moon Sig, Waste Module Separation Apparatus, Sep. 2022 (Year: 2022).*

* cited by examiner

*Primary Examiner* — Queenie S Dehghan
(74) *Attorney, Agent, or Firm* — Heedong Chae; Lucem, PC

(57) ABSTRACT

The present invention relates to a method for manufacturing glass beads using waste glass and to the glass beads themselves, and more specifically, it pertains to a method for manufacturing glass beads—particularly glass beads for road markings—by recovering waste glass such as waste automotive glass, waste solar panel glass, and general broken glass. To achieve the above objective, the method for manufacturing glass beads using waste glass according to the present invention includes the step of: a) separating waste glass from a waste solar panel. In this method for manufacturing glass beads using waste glass, step a) includes the process of heating the waste solar panel to a predetermined temperature and cutting the adhesive surface between the waste glass and the backsheet of the waste solar panel using a knife heated to a predetermined temperature.

5 Claims, 17 Drawing Sheets

FIG. 19

| Item Name | Test Analysis Item | Standard Value | Test Analysis Result | Test Analysis Method |
|---|---|---|---|---|
| Automotive Glass | Gel Percentage (Impurity %) | Less than 20% | 24 | KS L 2521: 2017 |
| | Glass Density (Solid State) | Grade 1: 1.50 or higher ~ 1.64 or lower | 1.50 or higher ~ 1.64 or lower | |
| | | Reflective Performance | 0.7 | |
| | Durability | No surface haze on the glass beads | None | |
| | | 1/100N HCl Consumption: 10ml or less | 1.0 | |
| Automotive Waste Glass Road Marking Bead Manufacturing Performance | | | | |

| Item Name | Test Analysis Item | Standard Value | Test Analysis Result | Test Analysis Method |
|---|---|---|---|---|
| Solar Glass | Gel Percentage (Impurity %) | Less than 20% | 17 | KS L 2521: 2017 |
| | Glass Density (Solid State) | Grade 1: 1.50 or higher ~ 1.64 or lower | 1.50 or higher ~ 1.64 or lower | |
| | | Reflective Performance | 0.9 | |
| | Durability | No surface haze on the glass beads | None | |
| | | 1/100N HCl Consumption: 10ml or less | 0.8 | |
| Solar Panel Waste Glass Road Marking Bead Manufacturing Performance | | | | |

METHOD FOR MANUFACTURING GLASS BEADS USING WASTE GLASS AND GLASS BEADS

FIELD OF THE INVENTION

The present invention relates to a method for manufacturing glass beads using waste glass and to the glass beads themselves. More specifically, it pertains to a method for producing glass beads-particularly those used for road markings—by recovering waste glass such as automotive waste glass, solar panel waste glass, and general broken glass.

BACKGROUND OF THE INVENTION

Generally, glass beads for road markings are either mixed into lane paint and applied or scattered over the lane paint immediately after it has been painted on the road and before it cures. This causes light to be reflected by the glass beads, allowing lane lines and other markings to be easily identified even at night or during rain.

These glass beads are usually manufactured by heating glass powder to a high temperature, melting it into beads, and then cooling and collecting the beads, as described in Korean Patent No. 10-0232478.

Meanwhile, manufacturing methods using waste glass have recently been proposed to recycle resources. Generally, such waste glass contains different additives (impurities) depending on its type of use, so it is necessary to separate and recover only the glass using different methods. The waste glass used mainly includes automotive glass, glass used in solar panels, and other broken glass.

For example, the glass used in solar panels (i.e., waste solar panels) is generally formed in a sandwich structure of tempered glass/encapsulant/cell (silicon)/encapsulant/backsheet, with ethylene vinyl acetate (EVA) used as the interlayer encapsulant.

To reuse the glass from such waste solar panels, it is economically advantageous to remove the EVA component used as the encapsulant to completely separate each layer. Related technologies include the organic solvent method, nitric acid method, pyrolysis method, and fluidized bed combustion method.

However, the organic solvent method and the nitric acid method require long processing times of about 10-20 days and 25 hours, respectively, and present secondary environmental pollution from waste liquids generated during the process. Additionally, the recovered solar cells may be damaged due to the swelling of EVA during separation.

Moreover, the pyrolysis method and the fluidized bed combustion method require high-temperature conditions of over 520° C. and 450° C., respectively, leading to the generation of harmful gases like NOx during the process. Furthermore, the encapsulant (EVA) surrounding the solar cell thermally decomposes at temperatures above 450° C. in the confined space of the glass/encapsulant/cell, producing CO, $CO_2$, and VOCs gases. The generated gases are emitted toward the relatively fragile cell, causing it to be damaged.

Therefore, there is a need for an environmentally friendly and economical method to manufacture glass beads using waste glass that addresses these issues.

SUMMARY OF THE INVENTION

Technical Problems

Accordingly, the present invention was conceived to solve the aforementioned problems.

The object of the invention is to provide a method for manufacturing glass beads using waste glass by effectively removing impurities such as the backsheet and residual encapsulant (EVA) from waste solar panels, thus enabling the production of glass beads utilizing pure waste glass.

Particularly, by removing the residual encapsulant in two heating steps at different temperatures, the invention improves the removal efficiency and work efficiency, thereby allowing for a more complete separation of waste glass from solar panels. This provides a method for manufacturing glass beads and the glass beads themselves.

Additionally, the object of the invention is to provide a method for manufacturing glass beads and the glass beads themselves that improve durability by coating the surface of the glass beads during production, allowing for the manufacture of homogeneous glass beads tailored to their intended use.

Solution to Problems

To achieve the above objectives, the method for manufacturing glass beads using waste glass according to the present invention includes:

a) a step of separating waste glass from a waste solar panel; where the method for manufacturing glass beads using waste glass is characterized in that:

Step a) includes a process of heating the waste solar panel to a predetermined temperature and a process of cutting and separating the adhesive surface between the waste glass and the backsheet of the waste solar panel with a knife heated to a predetermined temperature.

Furthermore, the method includes:

b) a step of heating the waste glass from step a), from which the backsheet has been removed, to a predetermined temperature to remove the residual encapsulant.

Additionally, the method includes:

c) a step of manufacturing glass beads using the waste glass;

Wherein step c) includes processes of crushing the waste glass to a predetermined particle size for recovery, heating and melting the crushed waste glass, blowing and cooling the melted glass to form beads, washing and drying the cooled glass beads, and coating the surface of the glass beads.

Moreover, the glass beads using waste glass according to the present invention are characterized in that:

They are manufactured from waste glass separated from a waste solar panel by cutting the adhesive surface between the waste glass and the backsheet using a knife heated to a predetermined temperature.

Advantageous Effects of the Invention

The method for manufacturing glass beads using waste glass and the glass beads according to the present invention:

Enhance the productivity and quality of glass beads by more effectively and completely removing impurities contained in waste glass, particularly the backsheet and encapsulant of solar panels, to utilize pure waste glass.

Specifically, by heating the interface area between the waste glass and the backsheet to a predetermined temperature and cutting this interface area with a knife heated to a predetermined temperature, the backsheet can be effectively separated and removed from the waste solar panel. This minimizes the load applied to the knife depending on the type and size of the waste solar panel, thereby minimizing damage, wear, or breakage of the knife. It also allows for easy replacement of the knife, thus reducing maintenance costs and time while improving the operator convenience.

There is an effect of increasing the durability of the glass beads through surface coating during the glass bead manufacturing process.

BRIEF DESCRIPTION OF THE DRAWINGS

FIG. 19 shows the test results of the glass beads manufactured from the waste glass recovered from the waste automotive glass and the waste solar panel glass.

DETAILED DESCRIPTION OF EMBODIMENTS OF THE INVENTION

Figure 1:
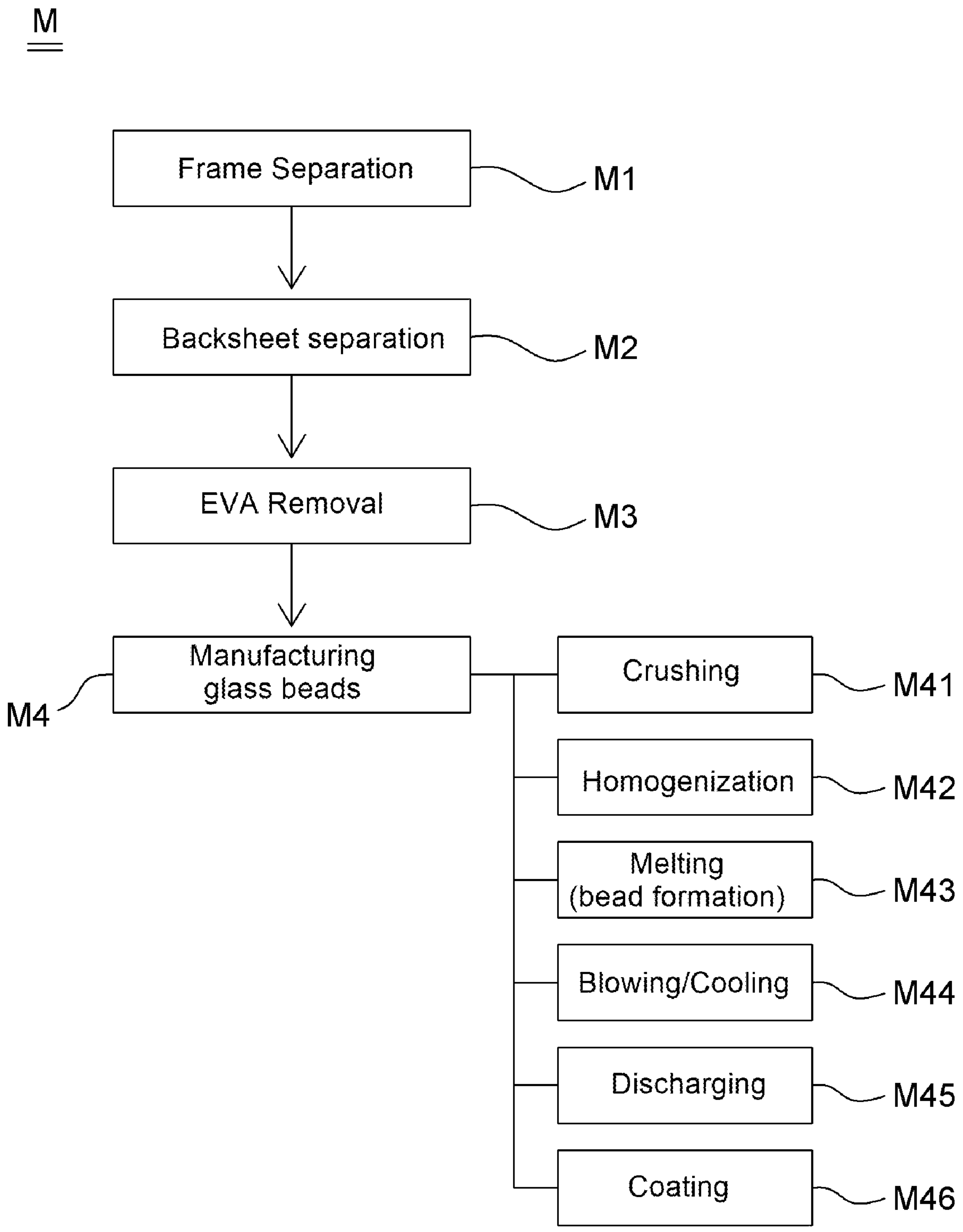
FIG. 1 is a block diagram of the method for manufacturing glass beads according to the present invention.

The present invention may be modified in various ways and take various forms; accordingly, specific embodiments (aspects) are described in detail herein. However, the specific embodiments (or aspects) described in this document are not intended to limit the invention to the particular disclosed forms, and all modifications, equivalents, and alternatives that fall within the spirit and scope of the invention are intended to be included within the scope of protection of the present invention.

In the drawings, the same reference numerals-particularly those with the same tens and units digits, or the same tens and units digits along with letters-denote components having the same or similar functions. Unless specifically mentioned otherwise, the components referred to by each reference numeral in the drawings should be understood as components conforming to these criteria.

Also, in the drawings, components may be depicted exaggeratedly large (or thick) or small (or thin), or simplified, for the sake of clarity and understanding. However, this should not be construed as limiting the scope of protection of the present invention.

The terms used in this specification are intended to describe specific embodiments (or aspects) and are not intended to limit the invention. The singular expressions include the plural expressions unless the context clearly indicates otherwise.

In this application, terms such as "comprising" or "composed of" are intended to specify that the features, numbers, steps, operations, components, parts, or combinations thereof described in the specification are present but do not preclude the possibility of the presence or addition of one or more other features, numbers, steps, operations, components, parts, or combinations thereof.

Unless otherwise defined, all terms used herein, including technical and scientific terms, have the same meanings as commonly understood by one of ordinary skill in the art to which this invention belongs. Terms generally defined in dictionaries should be interpreted in a manner consistent with the context of the relevant technology and should not be interpreted in an idealized or overly formal sense unless explicitly defined herein.

The terms "first," "second," etc., used in this specification are intended to distinguish different components but do not restrict the manufacturing order. The terms used in the detailed description and claims of the invention may not correspond to each other.

For convenience in explaining the method for manufacturing glass beads using waste glass and the glass beads according to the present invention, approximate directional references are specified with reference to FIG. 1. Setting the direction in which gravity acts as downward, the up, down, left, and right are determined as seen in the figure. In the detailed description and claims related to other drawings, directions are specified according to this criterion unless otherwise specifically mentioned.

Hereinafter, the method for manufacturing glass beads using waste glass and the glass beads according to the present invention will be described with reference to the accompanying drawings.

As illustrated in FIGS. 1 to 15, the present invention relates to a method for manufacturing glass beads using waste glass and to the glass beads themselves.

As a method for recovering pure waste glass, the method includes: a) removing the backsheet from a waste solar panel from which the frame has been removed (M2); b) removing residual encapsulant from the waste glass from step a) after the backsheet has been removed (M3); and as a method for manufacturing glass beads using pure waste glass, the method includes: c) manufacturing glass beads using the waste glass separated in step a) or the waste glass from step b) after the residual encapsulant has been removed (M4).

The step a) (M2) may include heating the waste solar panel to a predetermined temperature and cutting and separating the adhesive surface between the waste glass (G) and the backsheet (BS) in the waste solar panel with a knife (N) heated to a predetermined temperature.

Additionally, in the step b) (M3), the waste glass from step a) is heated to a predetermined temperature to remove the residual encapsulant (EVA).

Here, the glass beads according to the present invention can be manufactured by selecting either the waste glass from step a) or the waste glass from step b), depending on the process conditions. If the residual encapsulant is sufficiently removed along with the backsheet removal, the glass beads can be manufactured directly using the waste glass from step a) without going through step b).

The step c) (M4) may include: a process of crushing the waste glass (G) from the step a) or the step b) to a predetermined particle size and recovering a crushed waste glass; a process of heating and melting the crushed waste glass; a process of blowing and cooling the bead-formed waste glass; a process of washing and drying the cooled glass beads; and a process of coating the surface of the glass beads.

Before explaining this in more detail, generally, when manufacturing glass beads for road markings using recycled waste glass, the waste glass used must meet certain conditions. Specifically, it must have a refractive index of 1.50 to 1.80, sufficient retro-reflective performance, and be manufactured to a size of 0.3 mm or more. Therefore, not all types of waste glass can be recycled; only the types of glass that can meet these conditions-namely, general broken glass like window glass and industrial glass, waste automobile glass, and waste glass from solar panels-should be used.

In this embodiment, the goal is to stably and cost-effectively recycle waste automobile glass and waste glass from solar panels, which currently pose environmental problems, and to achieve environmentally sustainable recycling by manufacturing glass beads for road markings using such waste materials.

To achieve this, the invention employs a method for recycling waste glass by recovering waste glass in the most suitable way for each type of waste glass by using the broken glass recovery unit (A1), the waste automotive glass recovery unit (A2), and the waste solar panel glass recovery unit (A3).

Although not shown in the figures, the broken glass recovery unit (A1) uses commonly available equipment, such as a jaw crusher or hammer crusher, to crush the flat glass, such as window or industrial glass, to a predetermined particle size. The crushed glass is then recovered by the glass bead manufacturing unit described later. Since this is a well-known technique, a detailed explanation is omitted.

Figure 2:
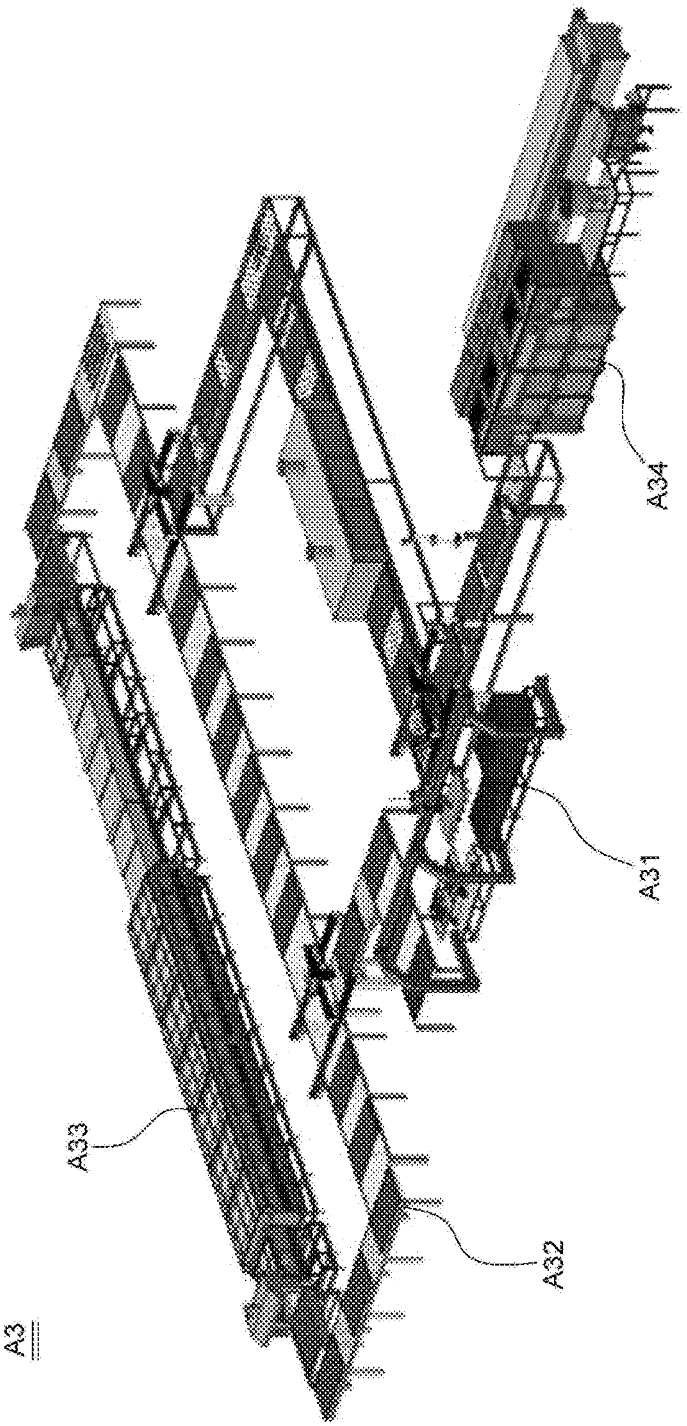
FIGS. 2 and 3 are schematic diagrams of the waste glass recovery unit according to the present invention.
Figure 3:
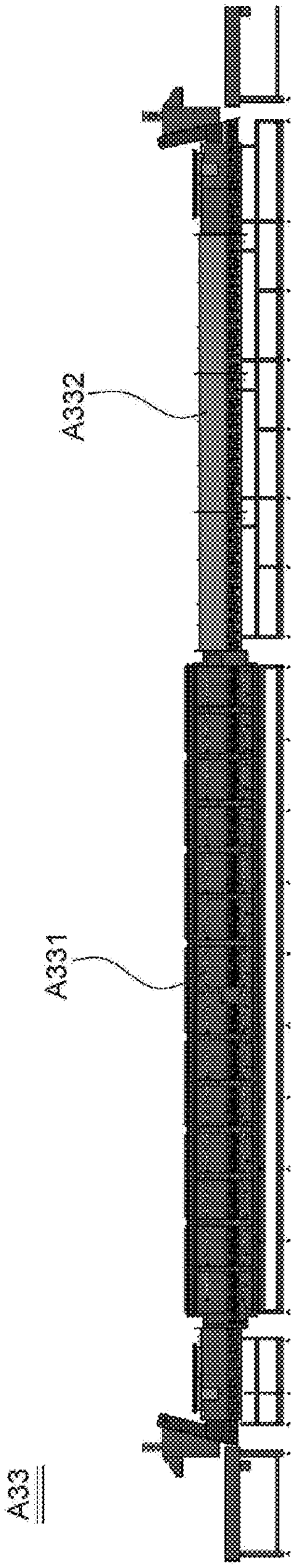
Figure 4A:
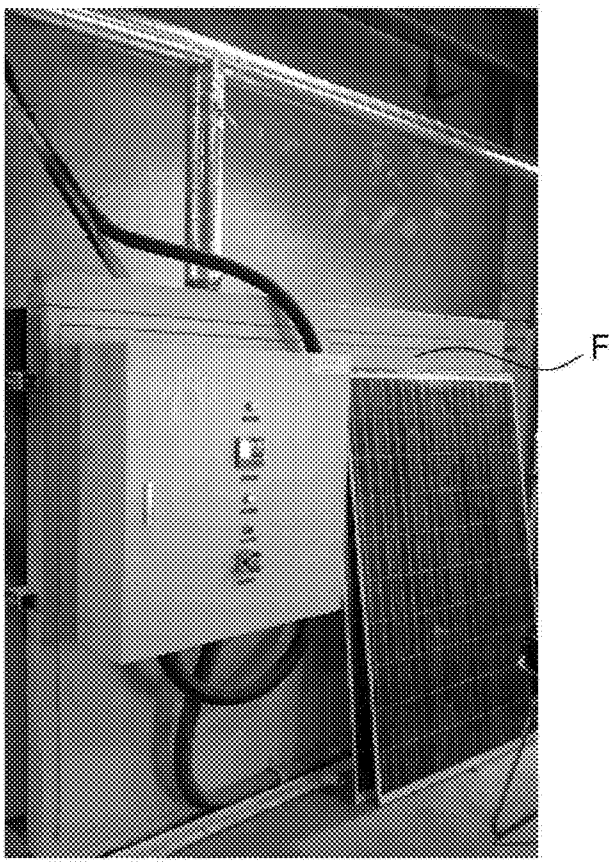
FIGS. 4A and 4B are photographs of the heat treatment component according to the present invention.
Figure 4B:
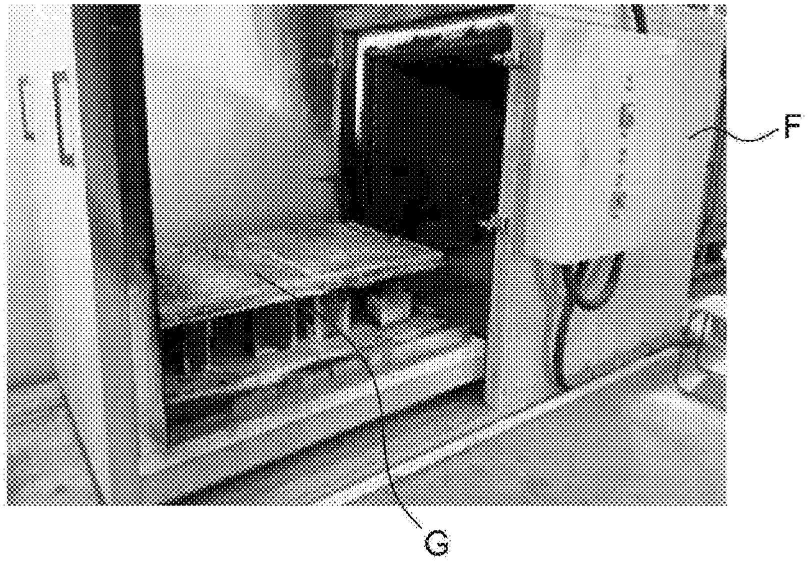

FIGS. 2 and 3 illustrate a schematic configuration of the waste solar panel glass recovery unit (A3), which is spaced apart from the broken glass recovery unit (A1) and is designed to crush and heat the waste glass from solar panels to recover it at a predetermined particle size. As shown in FIG. 1, this process includes a preliminary step of frame separation (M1) and two main recovery steps of a) backsheet separation (M2) and b) encapsulant (EVA, Ethylene Vinyl Acetate) separation (M3).

Referring to FIGS. 1 to 4B, the waste solar panel glass recovery unit (A3) is equipped with a frame removal section (A31) for removing the frame attached to the waste glass of the solar panel.

The frame removal section (A31) separates the aluminum (Al) frames attached to the waste glass of solar panels stacked in multiple layers—that is, it separates the frames attached to photovoltaic (PV) panels.

The waste glass (G) from which the frame has been removed in the frame removal section (A31) is transported to a removal section (A33) via a conveyor section (A32).

This invention involves heating the waste glass (G) containing the backsheet (BS) and residual encapsulant (EVA) at different temperatures for step-by-step separation (the step of removing the residual encapsulant can be omitted). To achieve this, it is preferable that the removal section (A33) is equipped with two heating elements (F), but it is also possible to use a single heating element (F) controlled by an operator to set different temperatures, and the scope of the claims should not be interpreted restrictively.

For the convenience of explanation, the drawings illustrate that the removal section (A33) is composed of a first removal section (A331) and a second removal section (A332) where each of the first removal section (A331) and the second removal section (A332) is equipped with a heating member (F).

The heating elements (F) can be electric furnaces, gas, plasma lamps, electric lamps, hot air blowers, heating wires, infrared, heated plates, electromagnetic waves, or other heat sources.

The present invention includes first carrying out Step M2, which separates the backsheet (BS) through the first removal section (A331), and then proceeding with Step M3, where the waste glass (G) is heated a second time in the second removal section (A332) to evaporate and remove residual encapsulant.

In the first removal section (A331), the bonding area between the waste glass and the backsheet, which is the EVA adhesive surface, is momentarily heated to 150-250° C. to reduce the adhesive strength.

This is because the adhesive used for the backsheet is typically a highly durable polymer adhesive such as two-component polyurethane adhesive. For these polymer adhesives, unless the adhesive strength is reduced using high temperatures, it becomes difficult to separate the backsheet in the first removal section (A331). Although there may be differences depending on the degree of aging of the waste glass from solar panels, to reduce the adhesive strength of the adhesive used in the backsheet in a short time, the heating temperature must be maintained at least above 100° C. Additionally, for composite adhesives that are resistant to temperature changes and not easily hydrolyzed, separation may be possible at temperatures above 200° C. This is to ensure the effective removal of the backsheet adhesive.

Moreover, for the convenient separation of the backsheet, the backsheet's adhesive must melt while the EVA (Ethylene Vinyl Acetate) does not ignite, carbonize, or cure; only then is backsheet separation facilitated. Since the flash point of EVA is 260° C., it is preferable that the heat applied in the first heating section (A331) is set between 100-250° C.

Furthermore, the removal section (A33) is provided with a cutting means to directly separate and remove the backsheet from the waste glass of the solar panel.

As shown in FIGS. 7 to 11, the cutting means comprises a main body (N1) installed in the first removal section (A331), which can be raised and lowered; a knife (N) mounted at the front end of the main body (N1) (which corresponds to the rear end based on the conveyance direction of the waste solar panel); and a heating unit (N2) installed in the main body (N1) for heating the knife (N).

The main body (N1) is raised and lowered by a lifting unit to position the knife (N) in the conveyance path of the waste solar panel. The knife cuts and separates the boundary area between the waste glass (G) and the backsheet (BS) of the waste solar panel, specifically the EVA adhesive layer.

In other words, when the waste solar panel is heated to a certain temperature, causing the adhesive of the backsheet to melt, a knife (N), which is heated to a higher temperature than the waste solar panel, passes through the adhesive layer between the waste glass and the backsheet, cutting and separating the waste glass from the backsheet.

The knife (N) can have various cross-sectional shapes such as semicircular, elliptical, triangular, rhombic, or parallelogram, and can be formed differently depending on the type and size of the solar panel. When separating the waste glass and backsheet of the waste solar panel with the knife (N), this minimizes the load transmitted to the knife (N), thereby increasing its lifespan and reducing maintenance costs and time.

The heating unit (N2) heats the knife (N) to 200-550° C., maintaining sufficient heat to cut the EVA adhesive layer that bonds the waste glass and the backsheet, thereby separating the waste glass.

The heating unit (N2) ensures the fast and accurate separation of the EVA adhesive layer while preventing damage to the knife.

Figure 11:
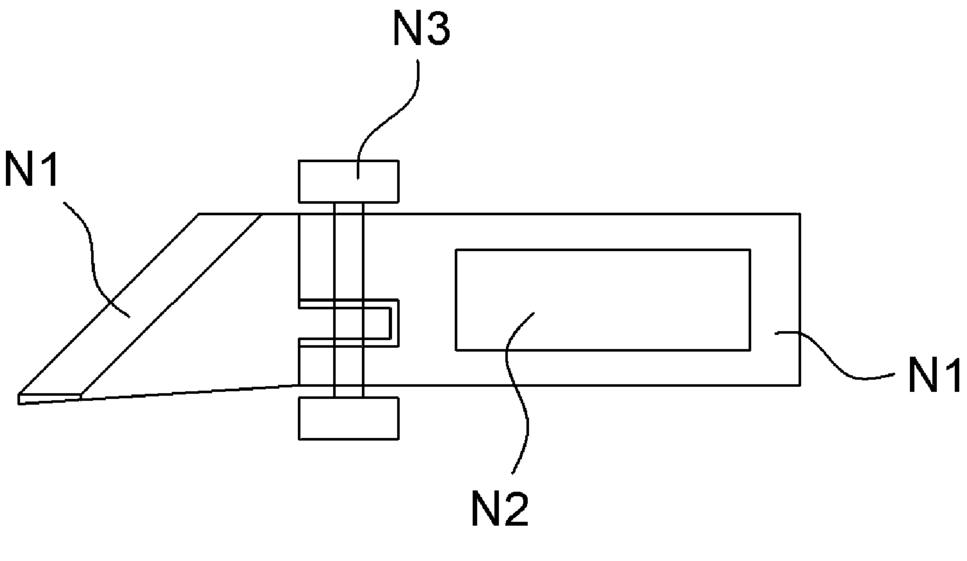
FIG. 11 is a side view of the key part of FIG. 7.

Additionally, as shown in FIG. 11, the knife (N) can be replaceably coupled to the front end of the main body (N1) using bolts and nuts. Preferably, an anti-loosening structure is applied (refer to FIGS. 16 and 17) to maintain a more secure connection of the knife (N), which will be described later.

The blade of the knife (N) is angled from the central tip of the blade to both ends of the knife (N) at 10-45 degrees with respect to the widthwise centerline at the central tip of the blade.

If the blade angle (a) of the knife (N) is less than 10 degrees, the pressure due to contact with the waste solar panel is too small. This results in uneven cutting during the movement of the waste solar panel, decreasing speed and accuracy. If the blade angle (a) exceeds 45 degrees, the pressure due to contact between the waste solar panel and the knife (N) becomes too great, which can lead to stress concentration and damage or wear on the waste solar panel or the knife (N). This increases maintenance costs and time, reducing recycling efficiency.

Figure 5:
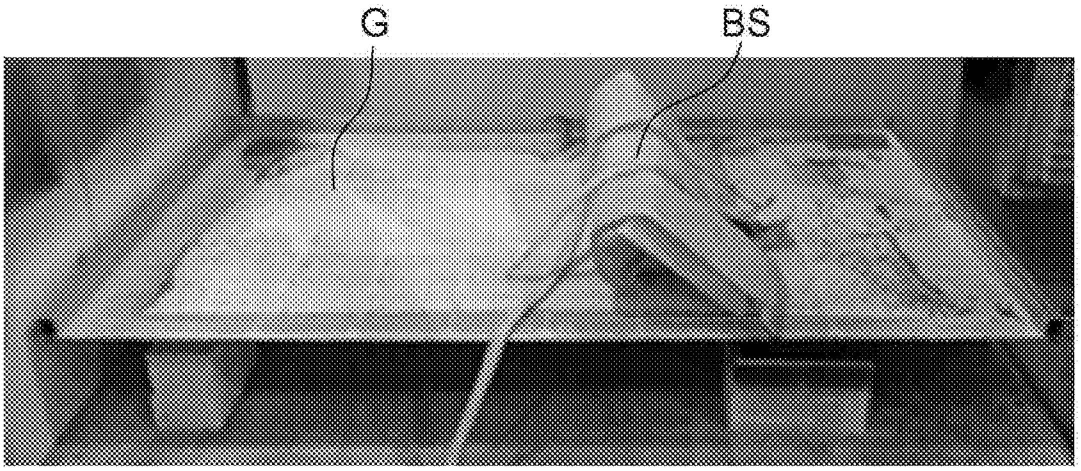
FIG. 5 is a photograph of the backsheet removal process according to the present invention.

FIG. 5 is a photo of the process where the backsheet (BS) is separated during step a) (M2).

For the following step b) (M3), the second removal section (A332) applies high-temperature heat to the waste glass from which the backsheet has been removed to remove any residual encapsulant (EVA) and cells (silicon) attached to the waste glass. This can be done by directly heating using a rack (L) into which the waste glass is inserted and equipped with a heating wire (PL), or using a press (P) equipped with a heating wire (PL). Indirect heating methods using infrared or hot air blowers, or a combination of two or more of these methods, can also be used.

Figure 18:
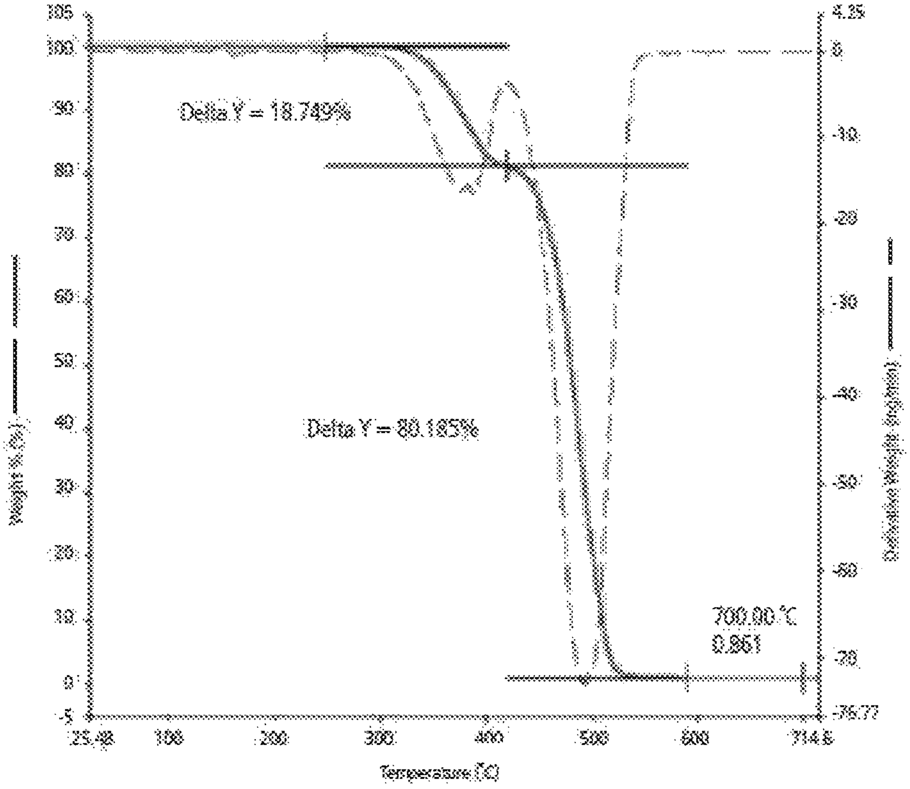
FIG. 18 shows a thermogravimetric analysis.

FIG. 18 shows a thermogravimetric analysis.

The temperature applied in the second removal section (A332) is set between 350-700° C.

FIGS. 12A to 13C illustrate direct heating methods using racks (L) and presses (P).

Specifically, after attaching the rack, which has the function of transferring thermal energy via heating wires or other methods to the waste glass, the rack is heated using the heating element to a temperature of 350-700° C. As the heat is directly transferred to the waste glass through the rack, energy loss can be minimized. Additionally, the heating element can be stacked in multiple layers, allowing a large amount of waste glass to be processed simultaneously. By securely fixing the waste glass, it prevents breakage due to EVA evaporation shock or thermal shock.

Figure 12A:
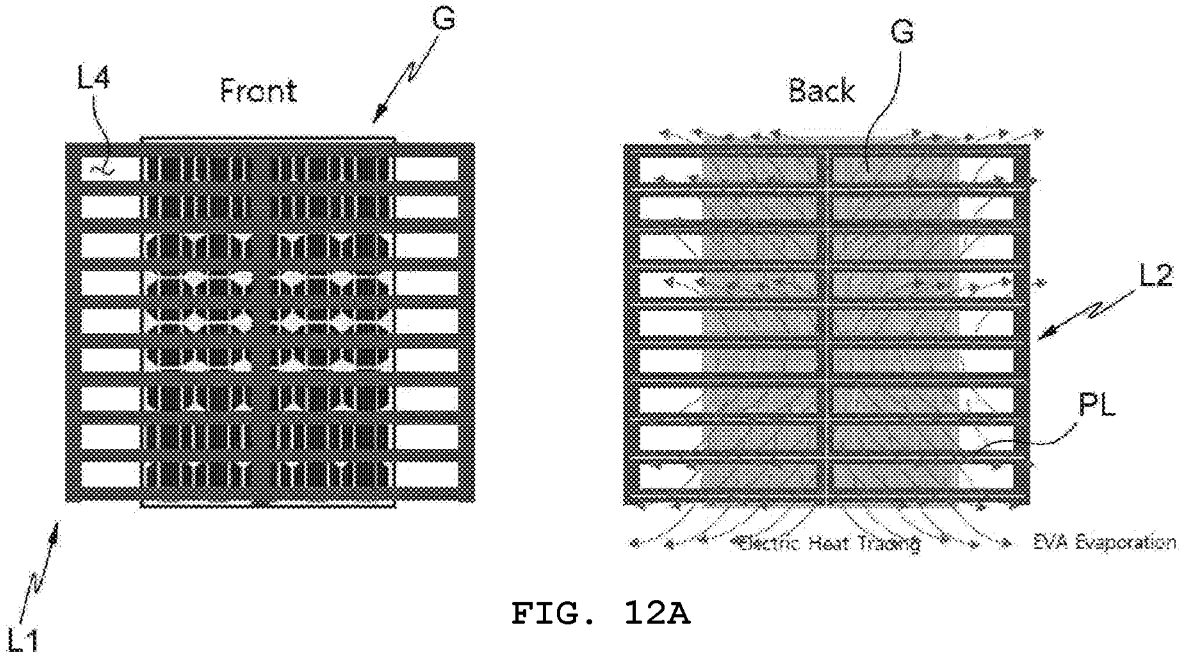
FIGS. 12A and 12B is an implementation diagram of the rack used in the waste glass recovery unit according to the present invention.
Figure 12B:
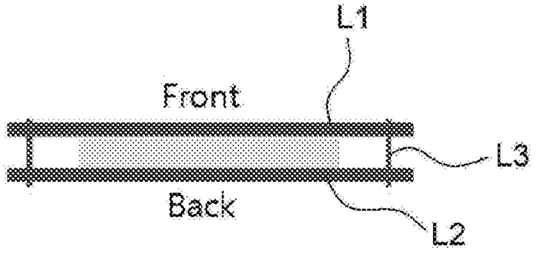
Figure 13A:
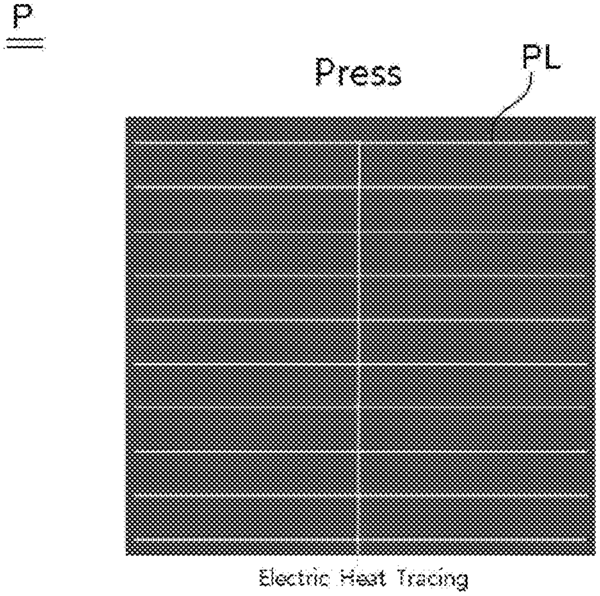
FIGS. 13A, 13B and 13C are implementation diagrams of the press used in the waste glass recovery unit according to the present invention.
Figure 13B:
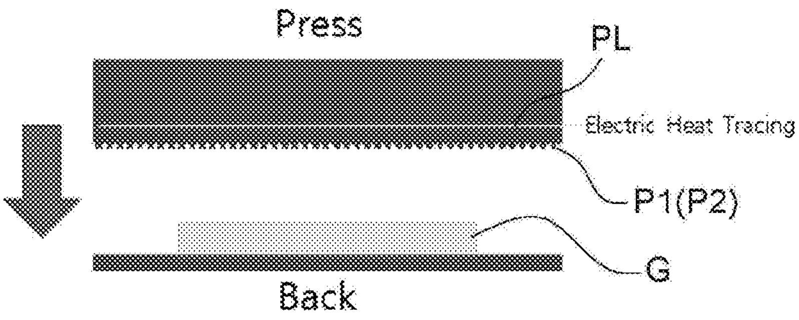
Figure 13C:
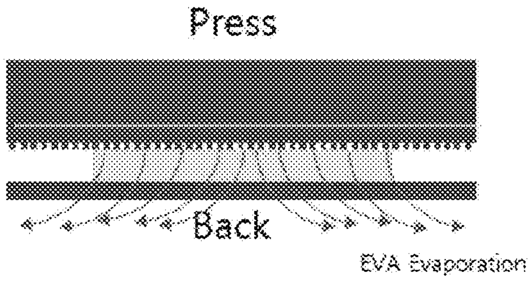

As shown in FIGS. 12A and 12B, the rack (L) is a grid-shaped mesh with multiple perforations (L4). It includes an upper rack (L1), a lower rack (L2), and connecting bars (L3) that link the upper rack (L1) and lower rack (L2). Either the upper rack (L1), the lower rack (L2), or both may be equipped with heating wires (PL), which directly transfer heat to the waste glass (G) through the heating wires (PL), thereby improving work efficiency.

In particular, the formation of the pores (L4) in the rack helps prevent the waste glass from breaking due to the pressure of evaporating EVA, while also allowing effective heat circulation.

Additionally, after combining the rack with the waste glass, it is preferable to set the processing time through the heating element to around 0.5 to 5 hours.

Another direct heating method involves using a press (P) equipped with heating wires, as used during the backsheet removal, to directly apply heat to the waste glass. By utilizing contact heat, the EVA can be evaporated, reducing energy loss and increasing processing speed (see FIGS. 13A to 13C).

Additionally, by using the press (P) to make close contact with the waste glass, the glass can be securely fixed, preventing damage from EVA evaporation shock or thermal shock. Similar to the rack, the press (P) should have grooves for ventilation. This can be addressed by designing the contact surface (P1) of the press (P), which makes contact with the waste glass, with a corrugated surface (P2) instead of a flat surface.

Specifically, the grooves formed on the corrugated surface are preferably 0.1 to 10 mm in depth, 1 to 30 mm in width, and the spacing between the exhaust channels preferably ranging from 5 to 30 mm.

Furthermore, to maintain continuity with the first removal section (A331), the heating member (F) of the second removal section (A332) preferably uses an indirect heating method such as an electric furnace, gas, plasma lamp, heating lamp, hot air blower, heating wire, infrared, heated plate, or electromagnetic waves, similar to the first removal section (A331). The temperature is set between 350-700° C.

Figure 6A:
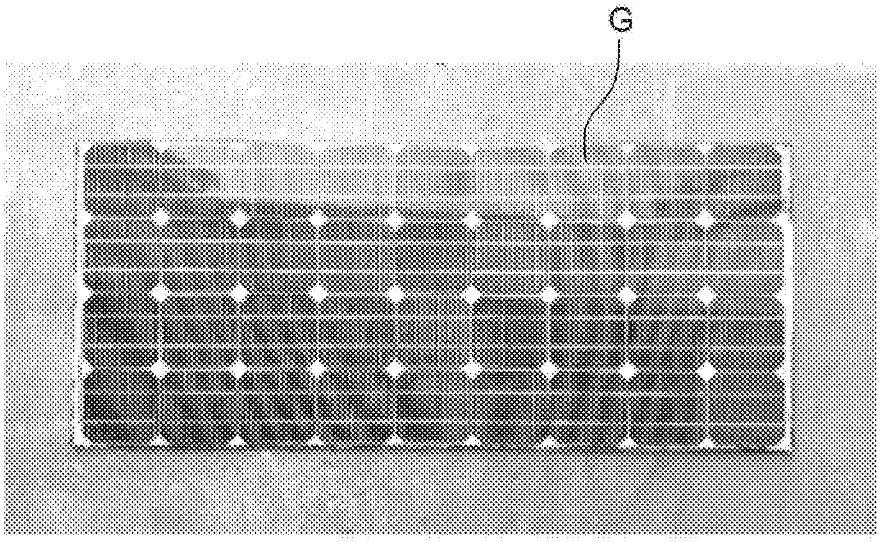
FIGS. 6A, 6B, and 6C are photographs of each step of separating the waste glass from a solar panel according to the present invention.
Figure 6B:
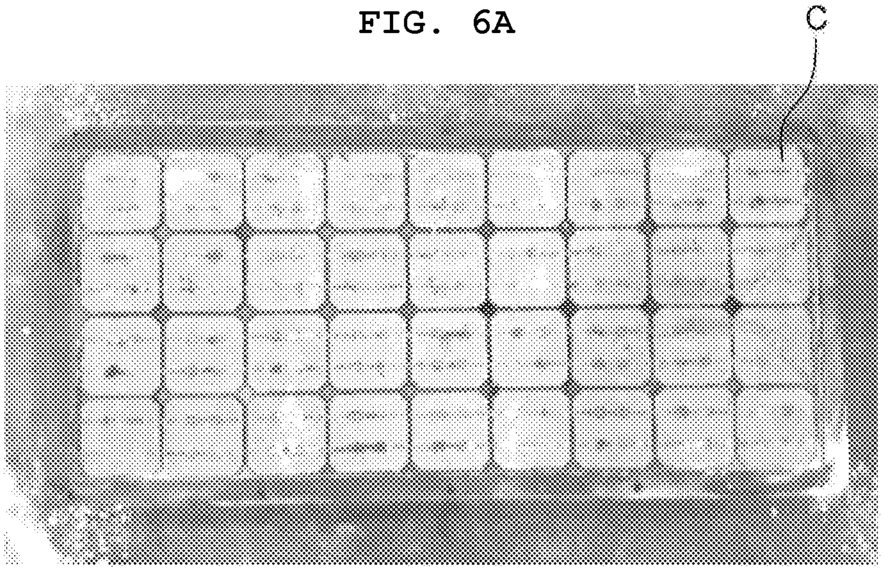
Figure 6C:
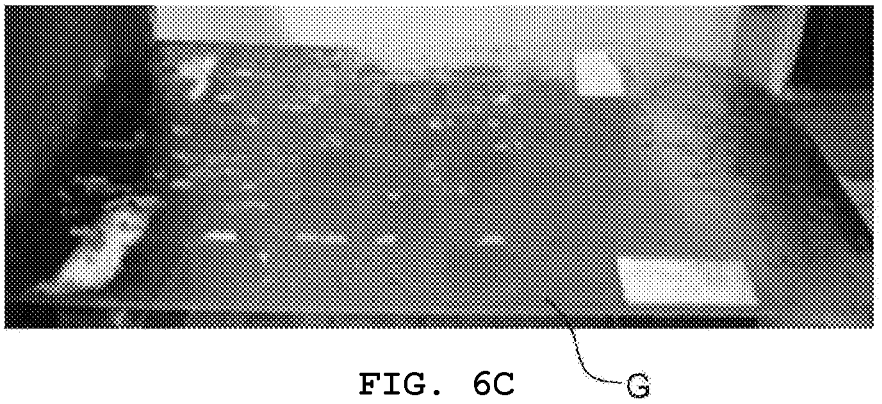
Figure 7:
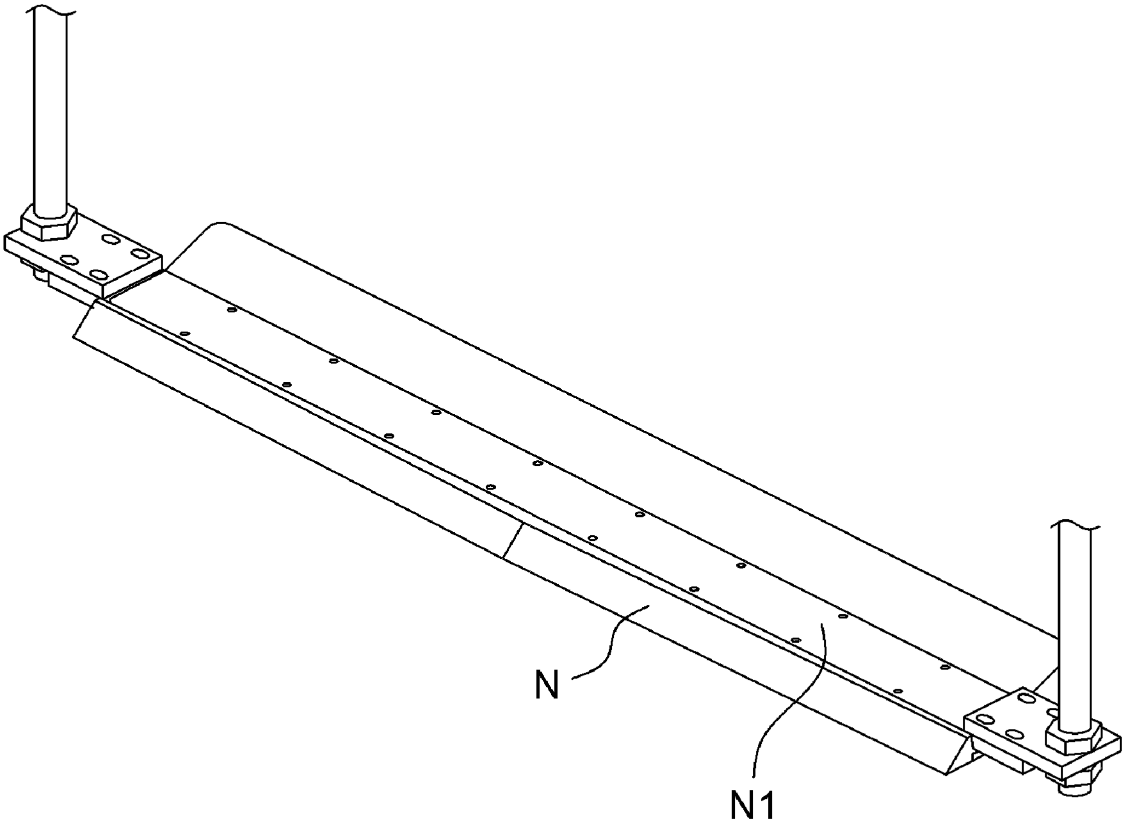
FIG. 7 is a perspective view of the key part of the knife according to the present invention.
Figure 8:
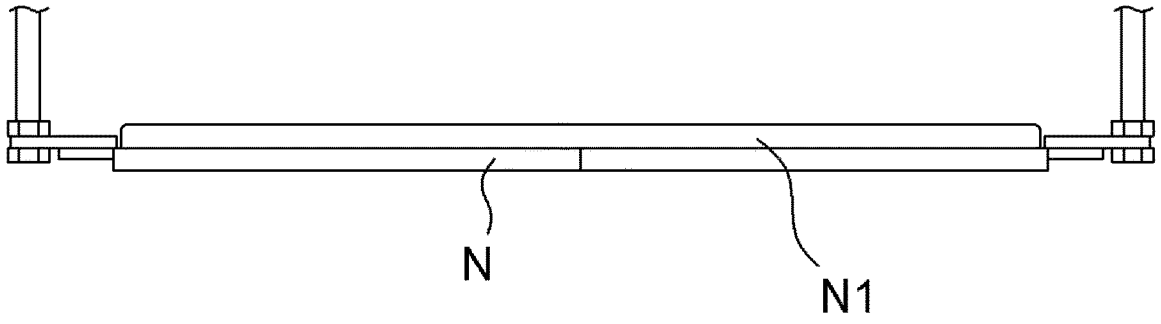
FIG. 8 is a front view of FIG. 7.
Figure 9:
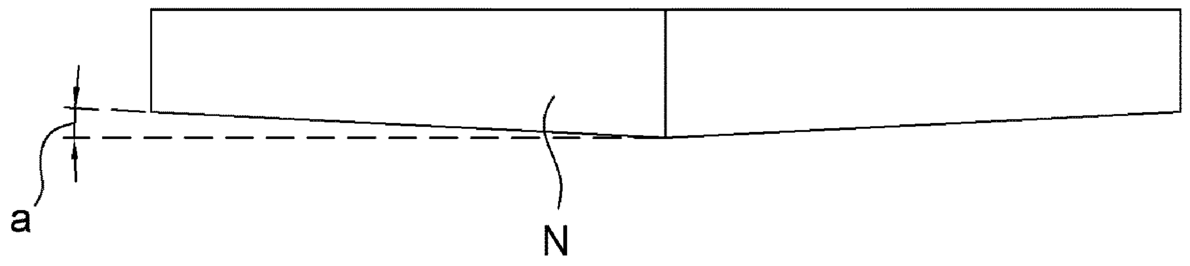
FIG. 9 is a plan view of the key part of FIG. 7.
Figure 10:
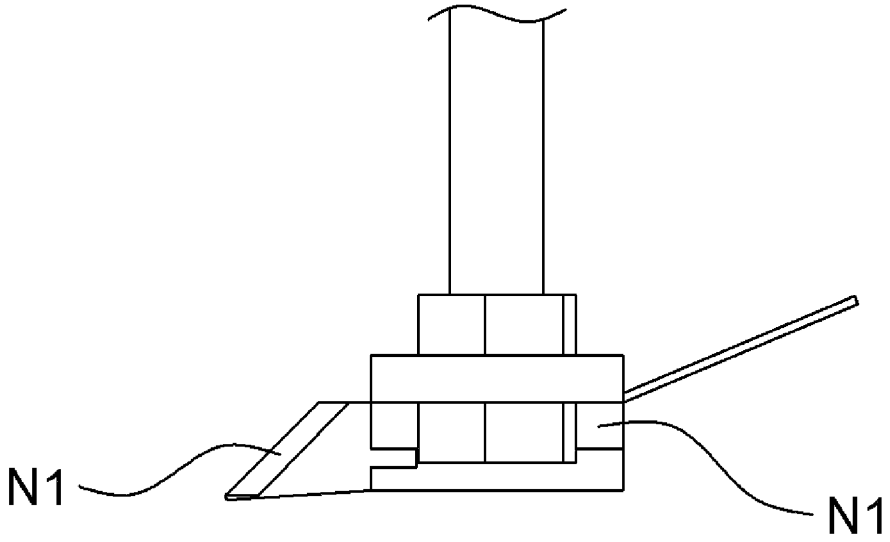
FIG. 10 is a side view of FIG. 7.

FIG. 6A is a photograph of the waste solar panel with the frame removed before the backsheet is removed. FIG. 6B is a photograph of the waste glass after the backsheet and EVA have been removed, following the second stage of heat treatment. FIG. 6C is a photograph of the waste glass from FIG. 6B with the cells (C) removed.

The following step (c) (M4) includes the processes of crushing (M41)—homogenization (M42)—melting (bead formation) (M43)—blowing and cooling (M44)—discharge (M45)—coating (M46).

As shown in FIG. 2, the waste solar panel glass recovery unit (A3) is further equipped with a crushing section (A34) for the crushing process, cleaning the waste solar panel glass through wet and chemical cleaning and then crushing it to a predetermined particle size before it is introduced into the glass bead manufacturing unit. However, the crushing section (A34) could also be connected to the glass bead manufacturing unit rather than the waste solar panel glass recovery unit (A3).

The automobile waste glass recovery unit (A2) is designed to crush the incoming automobile waste glass and remove the films that are separated during crushing, recovering only the crushed automobile waste glass of a predetermined particle size.

Figure 14:
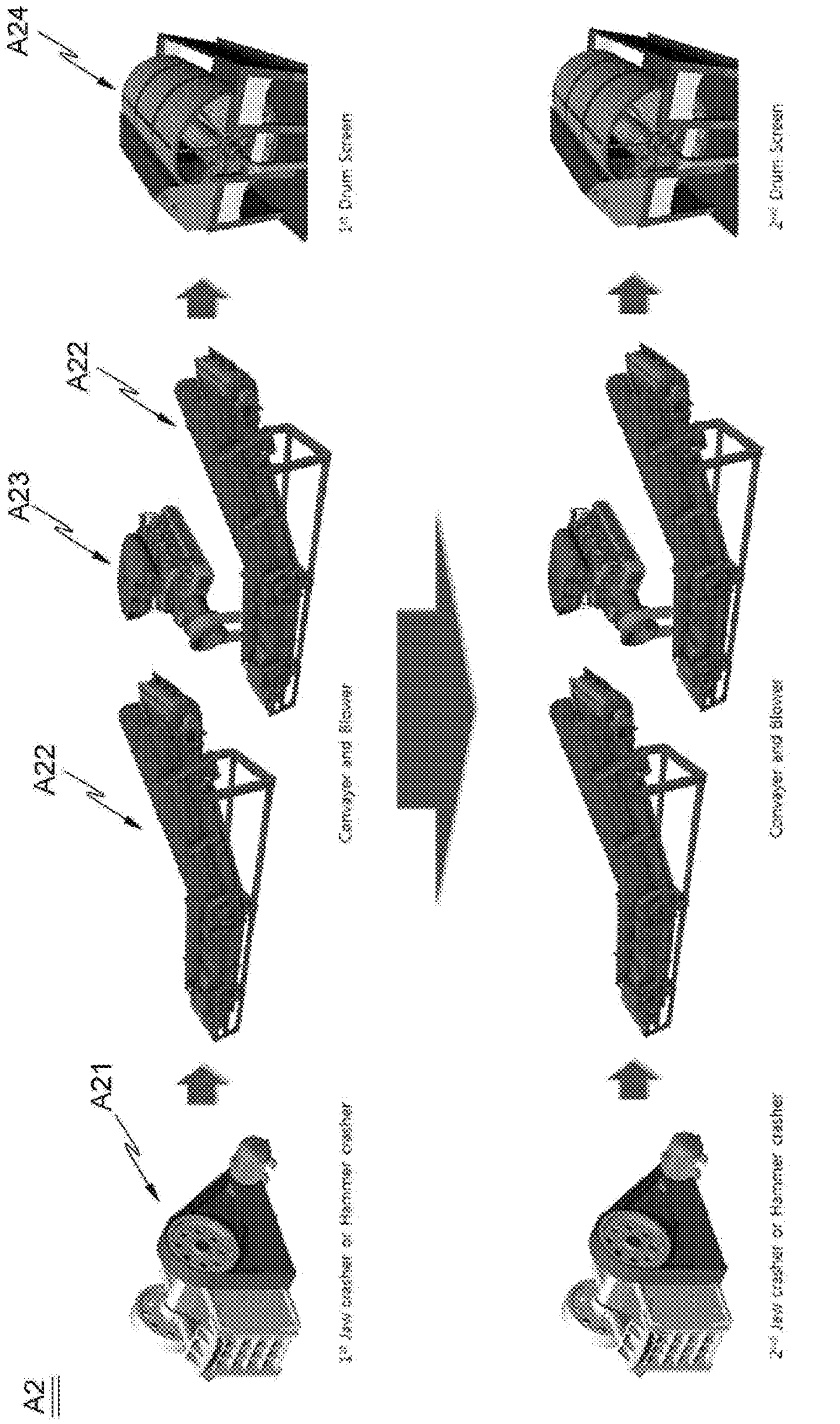
FIG. 14 is an implementation diagram of the automotive waste glass recovery method according to the present invention.
Figure 15:
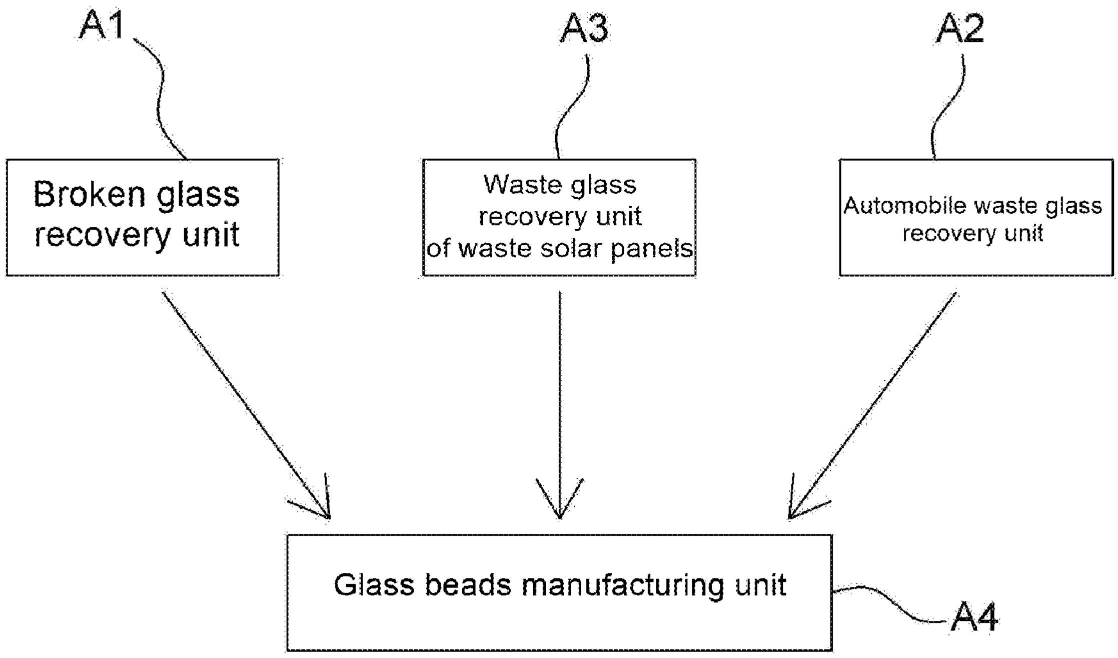
FIG. 15 is a schematic block diagram of the waste glass recovery method according to the present invention.

As shown in FIG. 14, the waste automotive glass recovery unit (A2) includes a crushing unit (A21), conveyor transfer unit (A22), blower unit (A23), and drum screen unit (A24).

First, the crushing unit (A21) is used in the waste automotive glass crushing step, where physical pressure is applied to crush the incoming waste automotive glass.

The crushing unit (A21) is comprised of a typical jaw crusher or hammer crusher, which repeatedly crushes the incoming waste automotive glass.

The conveyor transfer unit (A22) is designed to transport the crushed waste automotive glass along the recovery path, and it is arranged at an upward incline (the stage of conveying the crushed waste glass upward).

Preferably, the conveyor transfer unit (A22) includes at least one pair of spaced conveyor belts, allowing a step-like height difference to be formed between adjacent conveyor belts.

The blower unit (A23) is positioned on the conveyor transfer unit (A22), more specifically in the spaced area between a pair of conveyor transfer units (A22). It delivers a strong airflow toward the falling waste automotive glass. During the crushing process, the Polyvinyl Butyral (PVB) film, which was attached to the waste automotive glass and separated during crushing, is blown away by the strong airflow. At the same time, the waste automotive glass, which falls due to its weight, is first separated by gravity sorting (first separation stage).

Additionally, the drum screen unit (A24) is positioned at the end of the pair of conveyor transfer units (A22) and is designed to perform secondary separation of any remaining PVB film from the waste automotive glass, which has undergone the first separation stage by the blower unit (A23). The rotation of the drum screen enables this secondary separation, and the separated PVB film can be collected in a separate container, such as a box or hopper.

The waste automotive glass recovery unit (A31) may be equipped with two or more units to enable the repetition of each process multiple times, thereby improving the separation performance of the PVB film. This should not be construed as limiting the scope of the claims.

The broken glass recovery unit (A1), the waste automotive glass recovery unit (A2), and the waste solar panel glass recovery unit (A3) according to this embodiment are designed to recover waste glass from general waste glass, waste automotive glass, and waste solar panels, respectively, each following separate paths while maintaining a predetermined uniform particle size. After recovery, the waste glass is collectively transferred to the glass bead manufacturing unit for the production of glass beads for the subsequent processes of glass bead production (see FIG. 15).

The particle size of the waste glass processed through multiple stages and introduced into the glass bead manufacturing unit—whether it is broken glass, automotive waste glass, or waste solar panel glass—is preferably set between 0.3 and 2 mm.

This is because the current particle size standards for glass beads designated by the Korean government, under KS L 2521:2017, require the use of sieves with sizes of 850 μm, 600 μm, 300 μm, and 106 μm for Category A1, and 600 μm, 300 μm, and 150 μm for Category B1. These standards are based on the proportion of material remaining on each sieve. To stably produce glass beads within these size ranges, the glass must first be crushed into particles larger than these sizes. This approach ensures that after the sieving process, the glass bead manufacturing process can proceed smoothly, producing glass beads with a uniform particle size distribution.

In this way, when the crushed waste glass from various sources—such as broken glass, waste automotive glass, and waste solar panel glass—is collected together and processed in the glass bead manufacturing unit, impurities are removed through washing and chemical cleaning processes (using solvents like toluene, MEK, DMC, etc.). Following this, the glass beads are manufactured in a single process through the subsequent melting, blowing, and cooling processes.

More specifically, the purified waste glass is mixed through a blending process. The mixed waste glass is then transported along a recovery path and fed into a furnace. In the furnace, the crushed waste glass is melted by heat and transformed into glass beads (melting stage).

The beads formed during the melting stage are sorted using a vibrating feeder. The sorted beads then proceed to the cooling stage, where they are cooled using cooling jackets or similar equipment in a blower/reactor cooling unit.

Specifically, the beads form a spherical shape as they float inside the reactor. If the beads are not rapidly cooled or are sent to storage with latent heat, they may stick together, become dented, or get compressed due to their weight, leading to defects. To address these issues, it is necessary to equip the reactor cooling unit with a cooling jacket or use a cooling spiral.

In this embodiment, to improve cooling efficiency during the blowing and cooling stages and to reduce the power consumption of the blower, a water-cooled cooling unit is installed in the reactor's cooling section. Specifically, a water-cooled jacket is used, with groundwater circulating or connected to an external cooling tower via a water supply. This setup allows the molten surface of the beads to quickly form into spherical shapes while being cooled. Consequently, it reduces the defect rate of the glass beads while minimizing cooling costs.

Additionally, thermoelectric elements may be installed on the surface of the reactor cooling section, with the interior being cooled and the exterior emitting heat. By forming grooves on the surface of the reactor, cooling efficiency is maximized, thereby reducing power and water costs used in cooling more effectively.

Once the cooling stage is completed as described above, the beads are washed again to remove surface impurities. A drying stage follows, where any remaining moisture from the washing process is removed. Afterward, defective beads are separated through a sorting process, completing the bead production.

The invention involves recovering glass waste from various sources such as broken glass, waste automotive glass, and waste solar panel glass through multiple processes. When the recovered waste glass is used to manufacture glass beads for road markings, the PVB film, EVA, and polysilicon are thoroughly separated and removed through heat treatment. This ensures that no lead (Pb), arsenic (As), or antimony (Sb) is detected, while effectively meeting the requirements for the appearance, particle size, and performance (refractive index and retroreflective performance) of glass beads for road markings.

FIG. 19 shows the excellent test results of the glass beads manufactured from the waste glass recovered from the waste automotive glass and the waste solar panel glass.

Additionally, to manufacture glass beads for road markings, automotive waste glass, waste solar panel glass, and general broken glass (e.g., window glass, industrial glass) are crushed and separated through different processes. These are recovered in particle sizes between 0.3 and 2 mm, suitable for manufacturing road marking glass beads. This minimizes the defect rate and ensures the glass beads meet the required standards for refractive index and retroreflective performance.

Furthermore, the invention improves the separation performance of PVB film by installing multiple blowers and conveyors with drop sections during the crushing of automotive waste glass. During the crushing of waste solar panel glass, the use of two-stage heat treatment (both low and high temperatures) ensures the complete separation and removal of EVA and polysilicon. This prevents the detection of lead (Pb), arsenic (As), or antimony (Sb) when using automotive waste glass and waste solar panel glass to manufacture road marking glass beads.

Meanwhile, during the glass bead manufacturing process, the heating of the waste glass can utilize the waste heat generated by the heating member (F) of the waste solar panel glass recovery unit (A3).

Additionally, regular glass beads may be coated with amino silane-based compounds.

In this case, the coating solution is composed of 0.5-5 parts by weight of amino silane dissolved in 100 parts by weight of water, alcohol, or another solvent. The solution is mixed with the glass beads and stirred in a mixer for 3-5 minutes, after which the liquid is separated from the glass beads. The beads are then either dried naturally or dried with hot air, coating the surface of the glass beads with amino silane to improve durability.

Additionally, core beads can be manufactured in spherical shapes with sizes ranging from 0.5 to 0.15 mm.

Meanwhile, this invention applies an anti-loosening structure to the bolt connection between the knife (N) and the main body (N1) to address the issue of the bolt becoming loose due to vibration or pressure during cutting.

Figure 16:
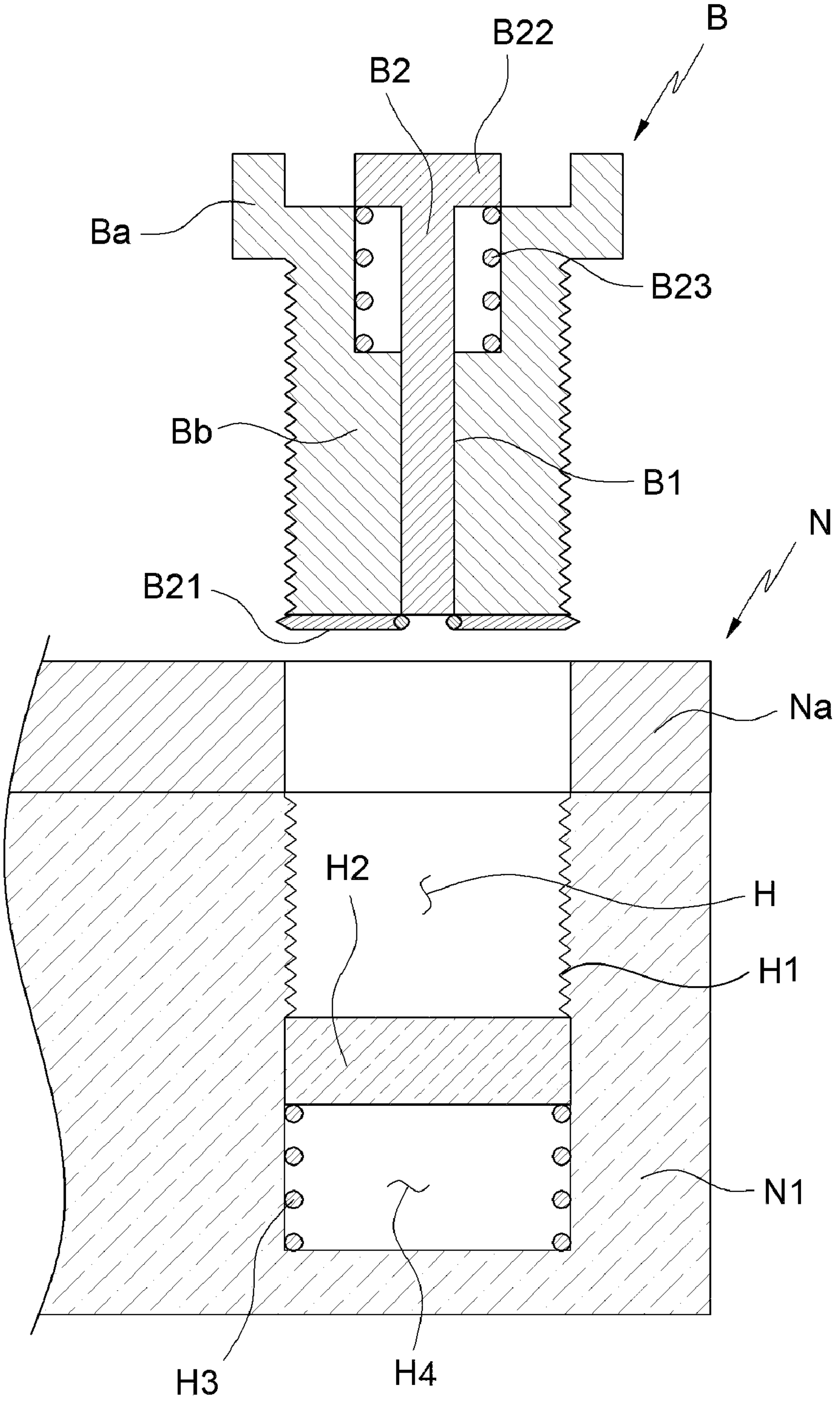
FIGS. 16 and 17 are cross-sectional views of the anti-loosening structure according to the present invention.
Figure 17:
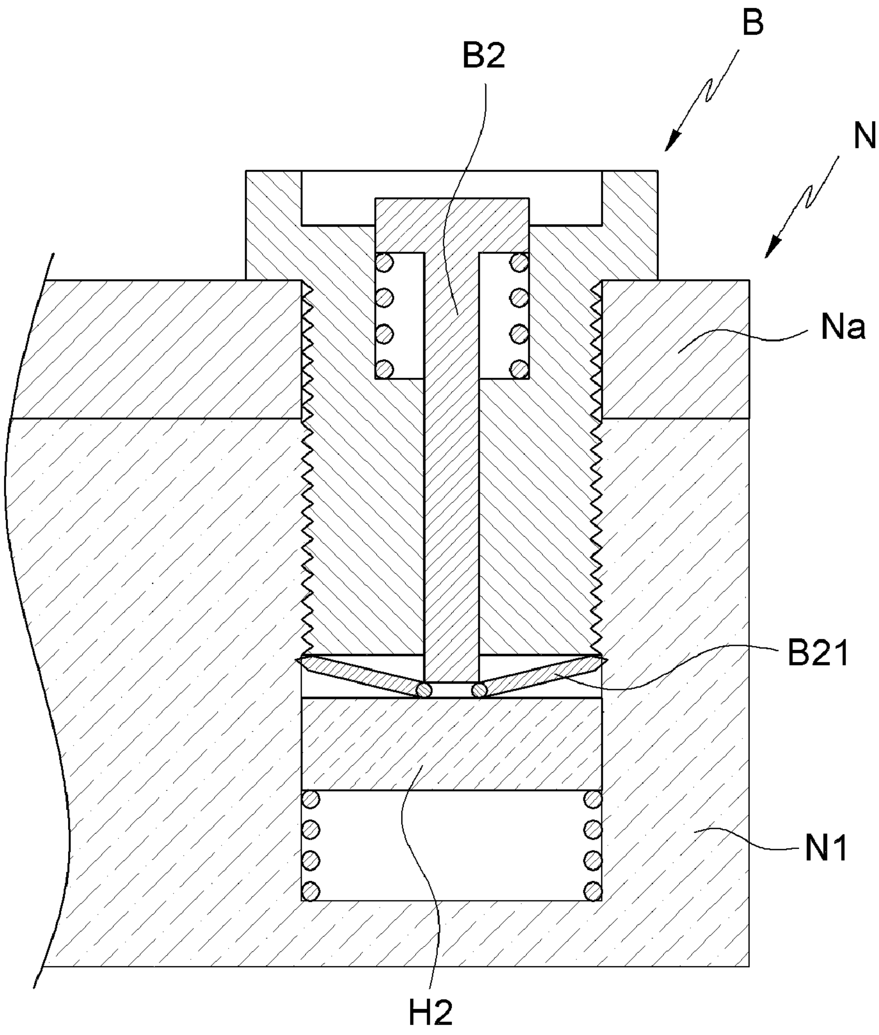

FIGS. 16 and 17 show an embodiment where, unlike in FIG. 11, the tail part (Na) of the knife (N) is directly connected to the upper surface of the main body (N1).

Referring to FIGS. 16 and 17, the anti-loosening bolt (B) that secures the knife (N) has a pull-out hole (B1) formed along its longitudinal direction. It includes a core member (B2), which is inserted into the pull-out hole (B1) and elastically supported toward the head (Ba) direction, with locking pieces (B21) that are hinge-coupled along the edge of the tip to rotate outward and have a length that slightly protrudes from the outer surface of the threaded portion (Bb).

The anti-loosening fastening hole (H) in the main body (N1) is connected to a lift groove (H4), where no threading is formed, extending from the bottom of the threaded part (H1). It further includes a pressure plate (H2), elastically supported in the lift groove (H4) toward the threaded part (H1).

When the anti-loosening bolt (B) is inserted through the knife (N) and fastened into the anti-loosening fastening hole (H), the locking pieces (B21) are forcibly fitted into the inner surface of the lift groove (H4), with the pressure plate (H2) elastically pressing the anti-loosening bolt (B) outward, functioning like a washer.

The core member (B2) is elastically supported by a first spring (B23) that pulls it toward the head (Ba) and supports the flange portion (B22), while the locking pieces (B21) are arranged radially at the tip of the threaded portion (Bb), each coupled to rotate.

The locking pieces (B21) are elastically supported by a torsion spring, which rotates them to be in close contact with the threaded portion (Bb). When the core member (B2) is pulled in, the pointed ends of the locking pieces (B21) protrude further than the threads of the threaded portion (Bb). When the core member (B2) is pulled out, the locking pieces (B21) fold, with their pointed ends housed inside the threaded portion (Bb).

The pressure plate (H2) is elastically supported by a second spring (H3) to be pulled up into the top portion of the lift groove (H4).

When the anti-loosening bolt (B) is tightened with a screwdriver, the core member (B2) is pushed out by the screwdriver, preventing the locking pieces (B21) from obstructing the threading.

Once the anti-loosening bolt (B) is tightened to the height of the lift groove (H4), the tip of the core member (B2) presses against the pressure plate (H2).

After fully tightening the anti-loosening bolt (B) and removing the screwdriver, the core member (B2) is pushed down, and the locking pieces (B21) unfold and contact the inner surface of the lift groove (H4). At this point, the pressure plate (H2) strikes the tip of the core member (B2), forcing the locking pieces (B21) into the inner surface of the lift groove (H4), securing them in place as if embedded.

At the same time, the pressure plate (H2) elastically presses the anti-loosening bolt (B) lengthwise, generating a force similar to a washer, which prevents the anti-loosening bolt (B) from loosening and ensures stable fastening.

The above description focuses on the glass bead manufacturing method and glass beads using waste glass, as illustrated with the accompanying drawings. However, the invention may be subject to various modifications, changes, and substitutions by those skilled in the art, and such modifications, changes, and substitutions should be interpreted as being within the scope of protection of the present invention.

EXPLANATION OF SYMBOLS

Explanation of Major Parts in the Drawings

M: Waste Glass Recovery Method
M1: Frame Separation Step
M2: Backsheet Separation Step
M3: Encapsulant Removal Step
M4: Glass Bead Manufacturing Step
A1: Broken Glass Recovery Unit
A2: Waste Automotive Glass Recovery Unit
A3: Waste Solar Panel Glass Recovery Unit

The invention claimed is:

1. A method for manufacturing glass beads using waste glass, the method comprising the step of:

a) separating waste glass (G) from a waste solar panel, wherein the step a) includes a process of heating the waste solar panel to a first predetermined temperature and a process of cutting an adhesive surface between the waste glass (G) and a backsheet (BS) of the waste solar panel using a knife (N) of a cutting means heated to a second predetermined temperature, wherein the cutting means in the step a) comprises:

a main body (N1) installed to be movable up and down within a first removal section (A331);

a knife (N) mounted at a front end of the main body (N1); and a heating unit (N2) embedded in the main body (N1) to heat the knife (N), wherein an anti-loosening bolt (B) that secures the knife (N) to the main body (N1) includes: a pull-out hole (B1) formed along the anti-loosening bolt's longitudinal direction; and a core member (B2) that is inserted into the pull-out hole (B1) and elastically supported toward a head (Ba) direction, wherein the anti-loosening bolt (B) is provided with locking pieces (B21), which are hinge-coupled along edge of a tip of the core member (B2), to rotate away from a bottom of the threaded portion (Bb), and having a length that slightly protrudes beyond an outer surface of the threaded portion (Bb), wherein an anti-loosening fastening hole (H) provided in the main body (N1) is connected to a lift groove (H4), in which no threading is formed, extending from a bottom of a threaded part (H1), and includes a pressure plate (H2) elastically supported in the lift groove (H4) toward the threaded part (H1), and wherein, when the anti-loosening bolt (B) is inserted through the knife (N) and fastened into the anti-loosening fastening hole (H), the locking pieces (B21) are forcibly fitted into the inner surface of the lift groove (H4), and the pressure plate (H2) elastically presses the locking pieces (B21) toward the bottom of the threaded portion (Bb), functioning as a washer.

2. The method of claim 1, further comprising the step of:

b) heating the waste glass (G) from the step a), from which the backsheet (BS) has been removed, to a third predetermined temperature to remove residual encapsulant.

3. The method of claim 2, further comprising the step of:

c) manufacturing glass beads using the waste glass (G), wherein the step c) includes a process of crushing the waste glass (G) to a predetermined particle size for recovery, a process of heating the crushed waste glass to melt it, a process of blowing and cooling the bead-formed waste glass, a process of washing and drying the cooled glass beads, and a process of coating a surface of the glass beads.

4. The method of claim 1, wherein in the step a), an adhesive surface of EVA (ethylene vinyl acetate) between the waste glass (G) and the backsheet (BS) is heated to 150-250° C. to reduce adhesive strength during the separation of the backsheet (BS).

5. The method of claim 1, further comprising the step of:

c) manufacturing glass beads using the waste glass (G), wherein the step c) includes a process of crushing the waste glass (G) to a predetermined particle size for recovery, a process of heating the crushed waste glass to melt it, a process of blowing and cooling the bead-formed waste glass, a process of washing and drying the cooled glass beads, and a process of coating a surface of the glass beads.

* * * * *